May 19, 1959  D. A. CUSANO  2,887,401
PREPARATION OF TRANSPARENT LUMINESCENT SCREENS
Filed June 27, 1956
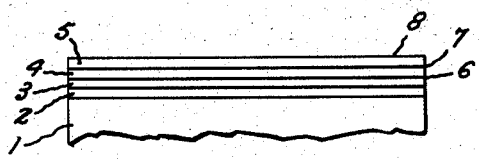
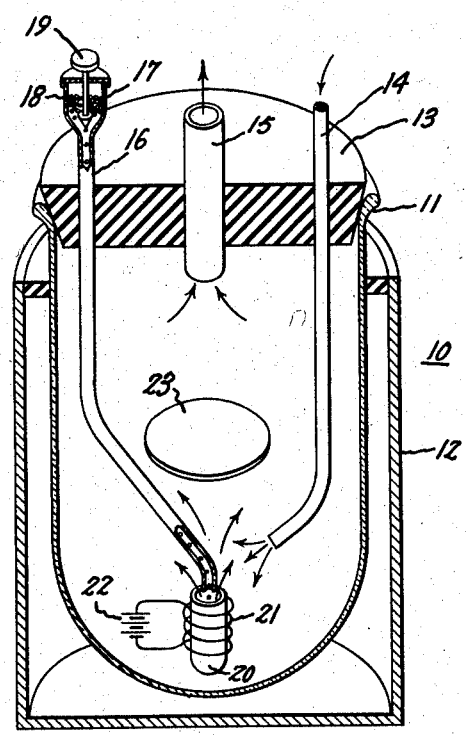
Inventor:
Dominic A. Cusano,
by Paul A. Frank
His Attorney.

United States Patent Office 2,887,401
Patented May 19, 1959

2,887,401

PREPARATION OF TRANSPARENT LUMINESCENT SCREENS

Dominic A. Cusano, Schenectady, N.Y., assignor to General Electric Company, a corporation of New York Application June 27, 1956, Serial No. 594,304

10 Claims. (Cl. 117—33.5)

The present invention relates to the preparation of improved transparent luminescent screens.

In Patent No. 2,685,530 to Cusano and Studer, issued August 3, 1954, there is disclosed and claimed a method of preparing transparent luminescent screens by a vapor reaction technique wherein vapors of a phosphor cation and an activator are reacted with a gas containing a phosphor anion in the vicinity of a heated substrate to result in the chemical deposition of a transparent luminescent screen upon the substrate.

Luminescent screens prepared in accord with the method of the aforementioned Cusano and Studer patent are greatly superior to conventional settled powder or suspended powder in dielectric phosphors. Since the vapor deposited phosphor films are continuous and transparent, there are no crystal interfaces to refract and reflect light emitted by the phosphor. This reflection and refraction of light in conventional phosphor screens results in a form of distortion known as halation in which each point of light emission caused by an incident electron beam is surrounded by a halo of light caused by reflection and refraction of light from that point. A further advantage of the screens of the aforementioned patent is that these screens do not exhibit a general grayish cast, as do conventional phosphor screens, resulting from the reflection of light exterior of the screen. The screens of the aforementioned patent have great utility for use in cathode ray tubes, television picture tubes, and similar applications where high definition and resolution are desired. While the luminescent screens deposited in accord with the Cusano and Studer method are highly satisfactory in operation, I have found that greatly improved transparent luminescent screens may be prepared in accord with the present invention.

One object of the present invention is to provide a method of preparing transparent luminescent screens of less porosity than heretofore available.

A further object of the invention is to provide a method of preparing transparent luminescent screens having a high degree of transparency and consequently which exhibit less scattering of incident light.

A further object of the invention is to provide a method of preparing transparent luminescent screens having a much greater thickness than heretofore obtainable.

In accord with the present invention I provide transparent luminescent screens having greater thickness, and greater transparency by first causing a phosphor layer to be deposited upon a suitable substrate or base plate by the chemical reaction between vapors of a phosphor cation and a phosphor activator and a gas containing a phosphor anion. The film so formed is then polished to optical smoothness and a second phosphor layer is deposited thereupon by the vapor reaction process. The processes of phosphor deposition and phosphor surface polishing are alternately repeated until a desired thickness of phosphor has been obtained. The resultant films in addition to having the normal characteristics of transparent screens, exhibit a higher transparency, are non-porous, and may be formed in heretofore unobtainable thicknesses.

The novel features believed characteristic of the invention are set forth in the appended claims. The invention itself together with further objects and advantages thereof may best be understood with reference to the following description taken in connection with the drawing in which:

Figure 1 illustrates, in vertical cross-section, a transparent luminescent screen formed in accord with the invention, and Figure 2 is a vertical cross-section of one apparatus with which the screen of Figure 1 may be prepared.

The transparent luminescent screen illustrated in Figure 1 comprises a suitable light transparent vitreous substrate 1 having on one surface thereof a transparent conducting film 2 upon which there are deposited transparent luminescent phosphor laminae 3, 4 and 5. Between luminescent phosphor laminae 3 and 4 is an interface 6 which is polished to optical smoothness. A similar optically smooth interface 7 exists between phosphor laminae 4 and 5 and a similar interface 8, polished to optical smoothness exists at the exposed surface of phosphor lamina 5. Transparent conducting film 2 may be considered as a part of the substrate or base plate upon which the laminated films of the invention are deposited. This film may be deposited in accord with the method disclosed and claimed in Patent 2,732,313 to Cusano and Studer. It will be appreciated that the present invention is directed to the method of forming laminated luminescent screens themselves and the resultant product and that presence of transparent conducting film 2 is not essential in the practice of the invention, although film 2 is present in the preferred embodiment of the invention.

Accordingly, in practicing the invention laminated transparent luminescent films may be deposited directly upon base plate 1 or upon transparent conducting film 2 which, if it is present, is first deposited upon base plate 1.

In Figure 2 of the drawing, one apparatus 10 for carrying out the method of producing transparent luminescent screens, as illustrated in Figure 1, includes a reaction chamber 11 which is placed in an oven 12 heated by a source, not shown. Alternatively, the chamber 11 may be wrapped with resistance heating wire or other means utilized to heat it to the desired temperature, such means being well known to the art. The upper, open end of chamber 11 is sealed with a stopper or plug 13 having openings therein for the passage of a gas supply tube 14, an evacuation tube 15 and a solid material introducing tube or conduit 16. Conduit 16 is terminated at its upper end by a compartment 17 for storage of material 18 as well as a valve device 19 to control the flow of material therethrough. Toward the lower end of chamber 11 is located receptacle or container 20 to receive material from conduit 16. Container 20 as well as other exposed parts is typically of an alundum, quartz or other materials which will not react with the materials used. In order that the material or materials in container 20 may be vaporized, the container is heated externally, as by electrical resistance wire 21. A battery 22 is symbolic of a suitable source of electric energy for heating resistance 21. The plate 23 or other object to be coated is placed above container 20 and the lower end of tube 14.

In operation, oven 12 or other heating means for chamber 11 is energized to raise the temperature of plate 23 to from about 500° C. to 700° C. and preferably from 570° C. to 620° C. The temperature should be sufficiently high to cause the chemical reaction of such portions of the gaseous dispersion as comes into contact with the heated base member, but should be below the temperature of volatilization of the resulting product.

Container 20 is heated to a temperature at which sufficient vaporization of the substance occurs to furnish sufficient vapor for the present purpose. The valve 19 is opened to allow charge material 18 to drop by gravity into container 20 where it is vaporized and rises upward. At the same time, a gas containing the phosphor anion is introduced through tube 14, the lower end of which is so located, as shown, that the gas intermingles and mixes with the vapors of the material 18 to form a gaseous dispersion. Chemical reaction occurs between the rising vapors and gas at the heated surface of plate 23 to form a product which is condensed and deposited as a continuous, transparent, non-granular, crystalline luminescent film on plate 23. The chamber is continuously evacuated through tube 15.

A particular advantage of the above-described method of heating a solid material into crucible 20 during the reaction is that, in a mixture of two or more materials, one of which may be more volatile than the other, the vapors above the container reacting with the gas from tube 14 always contain some of each material. This is to be contrasted with the situation in which the entire charge of solid material is placed in a container and heated, in which case the more volatile material escapes first, making the outer part of the film deficient in that material.

While the above-described apparatus is the preferred embodiment of that used in carrying out the deposition step of the present invention, the deposition may be practiced utilizing modified apparatus without detracting appreciably from the quality and characteristic of the final structure produced thereby.

Transparent luminescent films produced in accord with this invention may comprise any luminescent material the cation of which may be vaporized and the anion of which may be introduced into the treatment chamber in gaseous form. The invention is preferably practiced with any of the phosphors of the zinc-cadmium, sulfur-selenium family. Thus the cation of these phosphors preferably comprise zinc, cadmium, or mixtures thereof. The anion of these phosphors preferably comprise sulfur, selenium, or mixtures thereof. These phosphors may be activated with any of the well known luminescent phosphor activator as, for example, manganese, silver, copper, arsenic, phosphorus, or zinc.

A coactivator of the halogen family, and preferably chlorine, is also included in the material which preferably comprises the transparent luminescent screen. Both the above-mentioned activators and coactivators are incorporated into the screens of the invention in activator quantities, preferably in quantities of from 0.001 to 1.0% by weight of the phosphor.

Charge 18, which is volatilized in container 20, comprises a measured amount of the phosphor cation or a volatilizable inorganic salt containing the phosphor cation and the luminescence activator or a volatilizable inorganic salt containing the luminescence activator. Thus, for example, if the phosphor which is to be formed comprises copper activated zinc sulfide, charge 8 may comprise a mixture of zinc, zinc chloride, and copper or copper chloride. Similarly, if the phosphor which is desired to be formed comprises zinc-cadmium sulfide activated with manganese and chlorine, charge 18 may comprise a mixture of zinc, zinc chloride, cadmium, cadmium chloride and copper or copper chloride. The phosphor cation and the activator however need not be introduced as the chloride but may be introduced as another halide or as the nitride, phosphide, arsenide or any other suitable volatilizable inorganic compound thereof. In forming phosphor screens of the zinc-cadmium sulfo-selenide family the anion-containing gas may be hydrogen sulfide or hydrogen selenide at a pressure of 200 to 600 microns of mercury.

In practicing the invention to form a manganese and chlorine activated zinc sulfide phosphor film for example, a mixture of zinc and zinc chloride together with a measured quantity of manganese chloride is introduced into container 20 which is maintained at a temperature sufficiently high to vaporize the charge mixture, ordinarily 600° C. being adequate. The substrate upon which the phosphor is to be formed which, for example, may be glass or quartz, corresponding to plate 23 in Figure 2, is heated to a temperature of from 500 to 700° C. and preferably from 570 to 620° C. At the same time a stream of hydrogen sulfide at a pressure of from 200 to 600 microns of mercury is introduced into the treating chamber, as through conduit 14, the chamber being evacuated through conduit 15. As the vapors of the zinc, chlorine and manganese rise upward toward the plate to be coated, they intermingle with the hydrogen sulfide and react therewith producing on the plate a continuous, crystalline, transparent, non-particulate film which upon analysis is shown to be zinc sulfide activated with manganese and chlorine. The film is made initially in any thickness desired simply by varying the time of treatment. In one apparatus used (described hereinafter) a reaction time of 4 minutes causes the formation of a 1 micron thick film. In practice, the first formed film (film 3 in Figure 1) should ideally be from 1 to 3 microns thick, although satisfactory results may be obtained in the practice of the invention if the film is as thick as 10 microns.

After the formation of film 3, plate 23, with film 3 thereupon, is removed from chamber 11 and, after suitable cooling, the exposed surface of film 3 is polished to optical smoothness. As luminescent film 3 is removed from reaction chamber 11 it appears cloudy and only semi-transparent. Upon polishing, the cloudiness disappears and with sufficient polishing, the film appears completely transparent. The condition of optical smoothness of film 3, after polishing, may be determined visually, noting the absence of haze and diffuse reflection. Alternatively the smoothness may be determined by subjecting the screen to a cathode ray beam in a demountable cathode ray tube. In this case, optical smoothness is attained when a narrowly focused beam directed upon the luminescent screen results in a point of illumination thereon without any halation surrounding the illuminated area. Optical smoothness of polished surface 6 of layer 3 may also be determined by passing a parallel beam of visible light through the film and the base plate upon which it is deposited in a darkened room and noting any light scattering which occurs as the beam passes through the screen. Other tests for optical smoothness are well known to the art and are equally suitable for determining when surface 6 of film 3 has been polished to optical smoothness.

Surface 6 of film 3 may be polished to optical smoothness upon a lens grinding wheel or manually, by polishing with a suitable abrasive by hand. Suitable abrasives are well known to the art. The abrasive used may conveniently be aluminum oxide obtainable under the name "Precisionite," catalog No. 87725, manufactured by the Precision Scientific Co. of Chicago, Illinois. Another suitable abrasive is magnesium oxide (granular) metallographic polish obtainable under the name "Shamva" from Goiwynne Metals Corporation of New York City. In polishing surface 6 of layer 3 to optical smoothness, a water paste of the abrasive used is placed upon surface 6 and polishing is accomplished either with a lens grinding wheel or manually, until optical smoothness is obtained.

After surface 6 of layer 3 has been polished to optical smoothness, the base plate upon which layer 3 is deposited is washed in distilled water, dried, and returned to treatment chamber 11. A second layer 4 of the same phosphor material is then deposited by vapor reaction as described hereinbefore, the process being continued until a suitable thickness is again obtained. Conveniently, layer 4 may be any thickness up to approximately 10 microns but is preferably 1 to 3 microns thick.

After layer 4 has been deposited in accord with the aforementioned vapor reaction technique, base plate 23 is again removed from reaction chamber 11 and, after being cooled, surface 7 of layer 4 is polished to optical smoothness in a manner similar to that described with respect to surface 6 of layer 3.

The processes of depositing luminescent films by vapor reaction, and the subsequent polishing of the films to optical smoothness is continued until a suitable thickness is obtained. The final operation is to polish to optical smoothness the exposed surface of the last-deposited luminescent layer.

Transparent luminescent screens prepared in accord with the invention may be formed up to thicknesses of 100 microns or greater, any desirable thickness being attained by a repetition of the aforementioned processes of vapor deposition and polishing until the composite phosphor screen has been built up to the desired thickness. As mentioned hereinbefore, the individual laminae comprising the laminated luminescent screen may be as large as 10 microns, although preferably, the individual laminae are maintained at a thickness of approximately 1 to 3 microns for the attainment of maximum transparency and the optimum of other desirable characteristics. Screens formed in accord with the present invention are less porous than those formed by a single vapor deposition technique. Because of the reduced porosity of these screens, they are more transparent, are less scattering, and may be deposited in thicknesses heretofore unobtainable without losing transparency.

While the exact reason for the superiority of the laminated phosphor screens produced in accord with the present invention over screens produced by a single vapor deposition step are not fully realized, it is believed that the superiority thereof is explained substantially as follows. When a single vapor deposited film is formed, it is formed upon an optically smooth surface. As the film begins to form, the individual molecules of the activated phosphor are laid down with geometrical regularity and form a continuous crystalline film. It is inevitable, however, that eventually a misfit of the molecular building blocks occurs, in which case a fault or deformation and irregularity of the crystalline structure occurs. With the continuous deposition of thick films, any fault formed is self-perpetuating and the resultant fault in the crystal structure becomes greater as successive molecular layers are laid down. Thus, with a thick film formed by a single vapor reaction technique, it is inevitable that a progressively increasing number of faults will be present. While screens so formed are greatly superior to the conventional settled powdered phosphor screens which exhibit much scattering and halation, due to the presence of individual microscopic crystals, the superiority is greatly increased by the method of the present invention. In this method, the formation of a single film by vapor deposition is preferably limited to a film several microns thick. Should any fault be present within the thin film so formed, the polishing of the exterior surface of this film to optical smoothness in accord with the invention, breaks the progression of crystal faults, and the next-deposited lamina of phosphor begins anew with an optically smooth surface. Thus, by periodically repeating the steps of vapor deposition and polishing the resultant film to optical smoothness, any already formed crystal faults are removed and crystaline regularity is restored to the film. This crystal regularity decreases the porosity of the resultant screens, results in greater transparency, less scattering and permits the production of screens of much greater thickness than heretofore obtainable.

One apparatus in accord with Figure 2 which has been successfully used to produce laminated transparent luminescent screens in accord with the invention comprised a four inch diameter quartz cylinder 11, 18 inches in length.

A Pyrex glass wafer 23 approximately 2 inches in diameter and 0.25 inch thick having thereon a 0.1 micron thick transparent conducting film of titanium dioxide deposited in accord with the method described and claimed in U.S. Patent 2,732,313 to Cusano and Studer was used. A laminated, transparent, crystalline, luminescent layer of zinc sulfide activated with approximately 1.0% by weight of manganese and chlorine, 12 microns thick was formed upon this base plate by the following steps. The base plate was first heated to approximately 600° C. Container 20 was maintained at a temperature of approximately 680° C. A pressure of approximately 300 microns of mercury of hydrogen sulfide gas was introduced into the treatment chamber which was continuously evacuated. A charge of 4 grams of elemental zinc, 2 grams of zinc chloride and 0.067 gram of manganese chloride was placed in compartment 17, and allowed to fall into evaporation chamber 20 at a uniform rate for approximately 8 minutes. During this 8 minute period a thin film of zinc sulfide activated with manganese and chlorine approximately 2 microns thick formed upon the titanium dioxide layer on base plate 23. Base plate 23, having thereon a layer of titanium dioxide and a first layer of activated zinc sulfide, was then removed and, after cooling, the surface of the phosphor was polished manually with a water slurry of Precisionite aluminum oxide abrasive until optical smoothness was visually observed to be attained. After the first-deposited film was polished to optical smoothness, the plate was returned to the reaction chamber and another layer of similar thickness was deposited. This layer was then polished to optical smoothness, and the process of alternate deposition of transparent luminescent layers and the polishing of the surfaces thereof to optical smoothness was repeated a total of six times until the composite laminated film was approximately 12 microns thick. This film was then thoroughly cleaned, washed, dried and placed in a demountable cathode ray tube and irradiated with cathode rays, under which excitation it emitted a yellow luminescence.

In another specific example of the practice of the invention, a laminated zinc-cadmium sulfide phosphor screen activated with approximately 0.05% by weight of silver and chlorine was prepared by the same steps as described with respect to the above description of the formation of a laminated zinc sulfide film. In the formation of the individual lamina of this laminated film, however, base plate 23 was maintained at a temperature of approximately 570° C. and container 20 was maintained at a temperature of approximately 640° C. A pressure of approximately 500 microns of mercury of hydrogen sulfide was continuously fed into the reaction chamber. Charge 18 consisted of 3 grams of cadmium iodide, 0.06 gram of zinc chloride, and 0.2 gram of silver chloride. Each lamina was formed by approximately 8 minutes of reaction, and had a thickness of approximately 2 microns. The other steps were substantially as described with respect to the zinc sulfide film. The resulting screen was approximately 10 microns thick.

In another specific example of the practice of the invention a laminated self-activated cadmium sulfide screen having approximately 0.5% by weight of chlorine as a co-activator was formed using substantially the same method steps as described with respect to the formation of the zinc sulfide film, above. In this example, however, the charge 18 consisted of 5 grams of elemental cadmium, and 2.5 grams of cadmium chloride. Plate 23 was maintained at a temperature of 600° C. and container 20 was maintained at a temperature of 650° C. An atmosphere of hydrogen sulfide at a pressure of approximately 300 microns of mercury was continuously fed into the reaction chamber during the deposition of each lamina, which was accomplished in approximately 8 minutes to form a lamina approximately 2 microns thick. The subsequent steps of polishing and deposition of further laminae was continued as with the zinc sulfide film to form a laminated film of self-activated cadmium sulfide approximately 10 microns thick.

In a further specific example of the practice of the invention a laminated zinc selenide screen activated with approximately 1.0% by weight of manganese and chlorine was formed using the same method steps as described with respect to the formation of the zinc sulfide film, above. In this example the individual lamina were formed with charge 18 consisting of 5 grams of elemental zinc, 2.5 grams of zinc chloride, and 0.05 gram of manganese chloride. Plate 23 was maintained at a temperature of approximately 600° C. and chamber 20 was maintained at a temperature of approximately 680° C. An atmosphere of hydrogen selenide at a pressure of approximately 300 microns of mercury was continually fed in the reaction chamber. The formation of each lamina was carried out on approximately 8 minutes to form a lamina of approximately 2 microns thick. The steps of polishing and vapor deposition were continued until the laminated film had a thickness of approximately 10 microns.

The foregoing specific examples are given merely to illustrate to those skilled in the art specific instances in which laminated films have been prepared in accord with the invention and are not to be construed in a limiting sense.

While the invention has been described with respect to certain features thereof it is apparent that many changes and modifications will immediately occur to those skilled in the art. Accordingly, I intend by the appended claims to cover all such changes and modifications as fall within the true spirit and scope of the foregoing disclosure.

What I claim as new and desire to secure by Letters Patent of the United States is:

1. The method of preparing thick laminated transparent screens of a luminescent phosphor which method comprises reacting in a treatment chamber at the surface of a heated transparent vitreous plate vapors of the phosphor cation and vapors of an activator for the phosphor with a gas containing the phosphor anion to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

2. The method of preparing thick laminated transparent screens of a luminescent phosphor which method comprises reacting in a treatment chamber at the surface of a transparent vitreous base plate maintained at a temperature from 500 to 700° C. vapors of the phosphor cation and vapors of an activator for the phosphor with a gas containing the phosphor anion to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

3. The method of preparing thick laminated transparent screens of a luminescent phosphor which method comprises reacting in a treatment chamber at the surface of a transparent vitreous base plate heated to from 500 to 700° C. vapors of a phosphor cation selected from the group consisting of cadmium, zinc and mixtures thereof and an activator for the phosphor with a gas selected from the group consisting of hydrogen sulfide, hydrogen selenide and mixtures thereof to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

4. The method of preparing thick laminated transparent screens of a luminescent phosphor which method comprises reacting in a treatment chamber at the surface of a transparent vitreous base plate, heated to from 500° C. to 700° C., vapors of a phosphor cation selected from the group consisting of cadmium, zinc and mixtures thereof and vapors of an activator for the phosphor with a gaseous mixture of hydrogen sulfide and hydrogen selenide to form by chemical deposition a thin film of activated phosphor, removing the plate from the treatment chamber, polishing the exposed surface of the phospor film to optical smoothness by rubbing with an abrasive substance, and repeating the steps of phosphor film deposition and surface polishing until a desired thickness is attained.

5. The method of preparing thick laminated transparent screens of a luminescent phosphor which method comprises reacting in a treatment chamber at the surface of a transparent vitreous base plate heated to from 500 to 700° C. vapors of zinc and cadmium and vapors of an activator for the phosphor with a gas selected from the group consisting of hydrogen sulfide and hydrogen selenide and mixtures thereof to form by chemical deposition a thin film of activated phosphor, removing the plate from treatment chamber, polishing the exposed surface of the phosphor film to optical smoothness by rubbing with an abrasive substance, and repeating the steps of phosphor film deposition and surface polishing until a desired thickness is attained.

6. The method of preparing thick laminated transparent screens of a luminescent phosphor which method comprises reacting in a treatment chamber at the surface of a transparent vitreous base plate heated to from 500 to 700° C. vapors of zinc, cadmium and an activator for the phosphor with a gaseous mixture of hydrogen sulfide and hydrogen selenide to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

7. The method of preparing thick laminated transparent screens of a luminescent phosphor which method comprises reacting in a treatment chamber at the surface of a transparent vitreous base plate heated to from 500 to 700° C. vapors of zinc, cadmium and an activator for the phosphor with gaseous hydrogen sulfide to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

8. The method of preparing thick laminated transparent screens of a luminescent phosphor which method comprises reacting in a treatment chamber at the surface of a transparent vitreous base plate heated to from 500 to 700° C. vapors of zinc, cadmium and an activator for the phosphor with gaseous hydrogen selenide to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

9. The method of preparing thick laminated transparent screens of a luminescent phosphor which method comprises reacting in a treatment chamber at the surface of a transparent vitreous base plate heated to from 500 to 700° C. vapors of cadmium and an activator for the phosphor with a gaseous mixture of hydrogen sulfide and hydrogen selenide to form by chemical deposition of a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

10. The method of preparing thick laminated transparent screens of a luminescent phosphor which method comprises reacting in a treatment chamber at the surface of a transparent vitreous base plate heated to from 500 to 700° C. vapors of zinc and an activator for the phosphor with a gaseous mixture of hydrogen sulfide and hydrogen selenide to form by chemical deposition a thin film of activated phosphor, removing the plate from the treatment chamber, polishing the exposed surface of the phosphor film to optical smoothness by rubbing with an abrasive substance, and repeating the steps of phosphor film deposition and surface polishing until a desired thickness is attained.

References Cited in the file of this patent

UNITED STATES PATENTS

| | | |
|---|---|---|
| 2,417,147 | Wood | Mar. 11, 1947 |
| 2,685,530 | Cusano et al. | Aug. 3, 1954 |

FOREIGN PATENTS

| | | |
|---|---|---|
| 252,782 | Great Britain | June 4, 1926 |